(12) United States Patent
Wakabayashi (10) Patent No.: US 8,016,437 B2
(45) Date of Patent: Sep. 13, 2011

(54) VEHICULAR DOOR MIRROR DEVICE

(75) Inventor: Shinichi Wakabayashi, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 12/056,009

(22) Filed: Mar. 26, 2008

(65) Prior Publication Data
US 2008/0247068 A1      Oct. 9, 2008

(30) Foreign Application Priority Data

Mar. 27, 2007  (JP) ................. 2007-081967

(51) Int. Cl.
*G02B 7/182*   (2006.01)
*B60R 1/06*    (2006.01)
(52) U.S. Cl. ......... 359/871; 359/841; 359/872; 359/877
(58) Field of Classification Search ........... 359/841, 359/871, 872, 877
See application file for complete search history.

(56) References Cited

U.S. PATENT DOCUMENTS

| 4,394,066 | A | * | 7/1983 | Sharp | 248/481 |
| 5,245,480 | A | * | 9/1993 | Polzer | 359/841 |
| 5,669,698 | A | * | 9/1997 | Veldman et al. | 362/494 |
| 5,726,816 | A | * | 3/1998 | Gordon | 359/872 |
| 5,781,353 | A | * | 7/1998 | Seubert et al. | 359/841 |
| 5,966,254 | A | * | 10/1999 | Flowers et al. | 359/841 |
| 6,019,475 | A | * | 2/2000 | Lynam et al. | 359/879 |
| 6,170,956 | B1 | * | 1/2001 | Rumsey et al. | 359/839 |
| 6,347,872 | B1 | * | 2/2002 | Brechbill et al. | 359/879 |
| 6,386,717 | B2 | * | 5/2002 | Miyabukuro | 359/879 |
| 6,481,863 | B2 | * | 11/2002 | Horio et al. | 359/872 |
| 6,554,436 | B1 | * | 4/2003 | Lang et al. | 359/841 |
| 6,830,352 | B2 | * | 12/2004 | Lang et al. | 359/872 |
| 7,249,860 | B2 | * | 7/2007 | Kulas et al. | 359/872 |
| 2001/0028178 | A1 | | 10/2001 | Mizutani et al. | |

FOREIGN PATENT DOCUMENTS

| EP | 1 138 552 A2 | 10/2001 |
| JP | 11-078695 | * 3/1999 |
| JP | 11-78695 A | 3/1999 |
| JP | 2001-122025 A | 5/2001 |
| JP | 2001-233128 A | 8/2001 |
| JP | 2006-290184 A | 10/2006 |
| WO | WO 03/033303 A1 | 4/2003 |

* cited by examiner

*Primary Examiner* — Ricky D Shafer
(74) *Attorney, Agent, or Firm* — Arent Fox LLP (57) ABSTRACT

A vehicular mirror device includes a housing which is comprised of two housing components at least partially opposed to each other, and which is adapted to cover a mirror from the front during traveling of a vehicle. A collar is integrally and projectingly provided on one of the housing components to extend so that it is superposed onto the other housing component at opposed portions of both the housing components, and a plurality of recesses are provided in a juxtaposed manner in a tip end of the collar. This suppresses to the utmost the generation of a wind roar due to traveling wind flowing into between opposed portions of the housing components.

10 Claims, 10 Drawing Sheets

VEHICULAR DOOR MIRROR DEVICE

BACKGROUND OF THE INVENTION

The present invention relates to a vehicular mirror device comprising a housing which is comprised of two housing components at least partially opposed to each other, and which is adapted to cover a mirror from the front during traveling of a vehicle.

DESCRIPTION OF THE RELATED ART

If gaps are created at small and constant distances between a plurality of members constituting a vehicular mirror device, a wind roar is generated by flowing of traveling wind entering the gaps at a constant flow speed. There is a vehicular mirror device already known from Japanese Patent Application Laid-open No. 11-78695, in which a plurality of dimples are formed at least one of opposed surfaces of a mirror base and a housing in order to reduce such a wind roar.

When the housing comprises two housing components, however, it is common that if dimples are formed in one of opposed surfaces of the housing components by applying the technique disclosed in the above Japanese document, the wall thickness at the opposed surfaces of the housing components is small in general. Thus, in order to form dimples, it is required that the wall thickness is relatively large, and it is difficult to form a plurality of dimples in one of the opposed surfaces of the housing components.

SUMMARY OF THE INVENTION

Accordingly, in view of the above-mentioned circumstances, it is an object of the present invention to provide a vehicular mirror device which is designed so that the generation of wind roar due to the flowing-in of traveling wind from between the opposed surfaces of the two housing components constituting the housing can be suppressed to the utmost.

In order to achieve the object, according to a first feature of the present invention, there is provided a vehicular mirror device comprising a housing which is comprised of two housing components at least partially opposed to each other, and which is adapted to cover a mirror from the front during traveling of a vehicle, wherein at least one collar is integrally and projectingly provided on one of said housing components to extend so that it is superposed onto the other housing component at opposed portions of both of said housing components, and a plurality of recesses are provided in a juxtaposed manner in a tip end of said collar.

According to a second feature of the present invention, in addition to the first feature, said collar is formed so that it is superposed on the other housing component from the inside.

According to a third feature of the present invention, in addition to the first or second features, said collar is integrally provided on said one housing component to extend in a direction of assembling of said housing components.

With the first feature of the invention, even if the traveling wind flows inwards from between the opposed surfaces of the two housing components, an air flow is disturbed by the plurality of recesses in the collar provided in one of the housing components, and thus, a flow speed becomes lower, so that the generation of wind roar can be suppressed to the utmost.

With the second feature of the invention, the collar provided on one of the housing components is superposed on the other housing component from the inside. Therefore, the collar cannot be visually observed from the outside and thus, the appearance cannot be impaired. On the other hand, in a mirror device in which a dimple is formed in one of opposed surfaces of both housing components, the dimple is located at a flow inlet of traveling wind and easily visually observed from the outside, thereby bringing about the degradation of an appearance.

With the third feature of the invention, the collar guides the assembling of both housing components to facilitate the alignment of the housing components with each other, and thus, it is possible to enhance the assemblability.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7 show the first embodiment of the present invention.

FIGS. 8 to 11 show the second embodiment of the present invention.

FIGS. 12 to 14 show the third embodiment of the present invention.

DESCRIPTION OF THE PREFERRED EMBODIMENTS

The present invention will now be described by way of embodiments with reference to the accompanying drawings.

Figure 1:
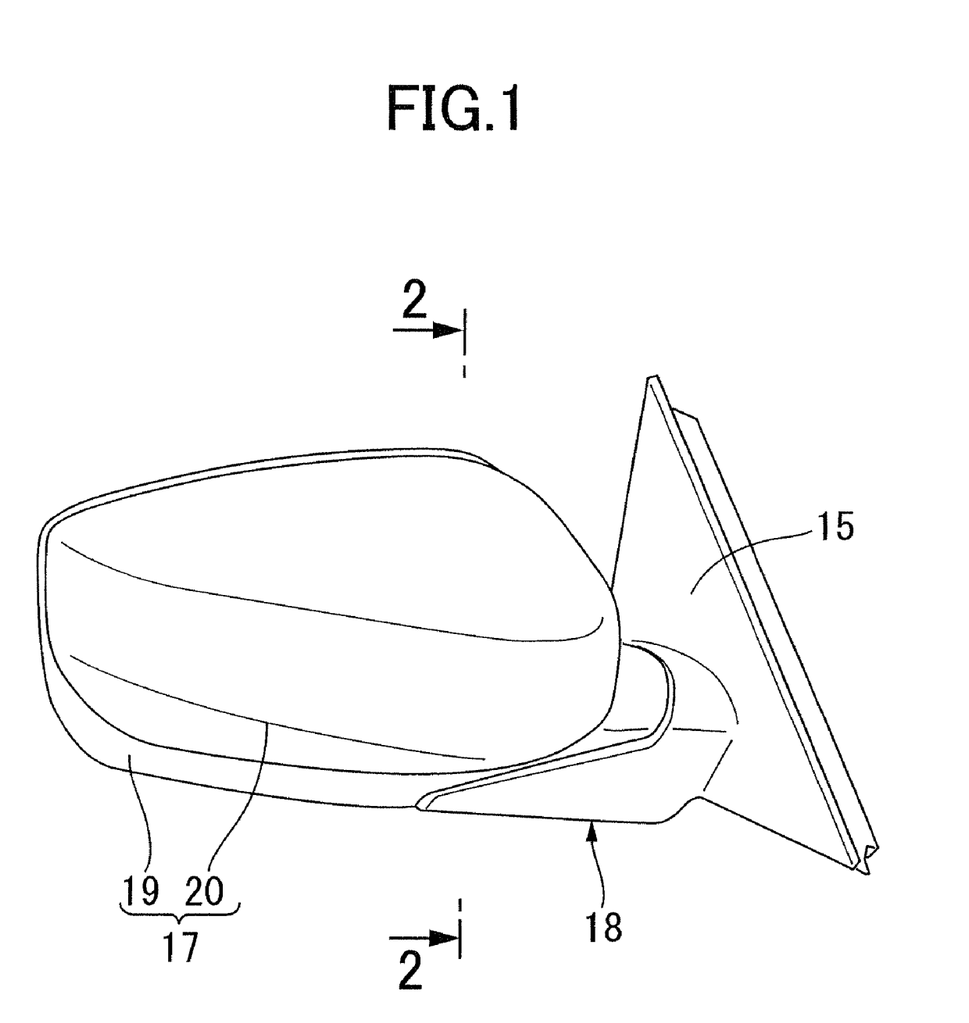
FIG. 1 is a perspective view of a vehicular mirror device according to the first embodiment.
Figure 2:
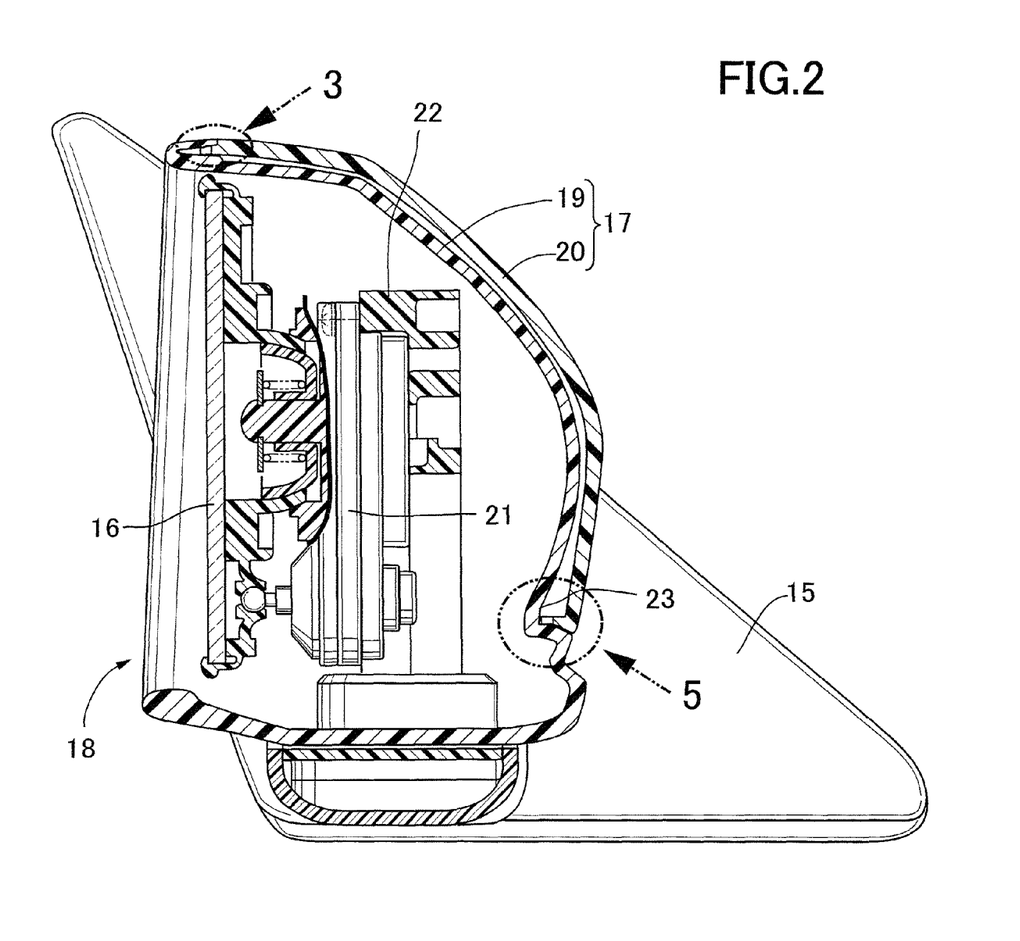
FIG. 2 is a sectional view taken along a line 2-2 in FIG. 1.

Referring first to FIGS. 1 and 2, a mirror device 18 is turnably supported on a base 15 mounted on a side door of a vehicle (not shown), and has a housing 17 adapted to cover a mirror 16 from the front during traveling of the vehicle. The housing 17 is comprised of two housing components: a housing body 19 and a decorative cover 20 coupled to each other.

The housing body 19 is formed into a bowl-shape in such a manner that the mirror 16 is disposed in an opening, so that the housing body 19 is opened rearwards during traveling of the vehicle. The decorative cover 20 covers a portion of the housing body 19, and is formed to extend along a shape of an outer surface of a portion of the housing body 19.

A support case 21 for rotatably supporting the mirror 16 is contained in the housing body 17 in such a manner that it is attached to a bracket 22; and the housing 17 is also attached to the bracket 22. Moreover, an actuator for turning the mirror 16 is contained in the support case 21, and the bracket 22 is turnably supported on the base 15.

The decorative cover 20 covers the housing body 19 in such a manner that an outer peripheral edge of the decorative cover 20 is opposed to a peripheral wall of a recess 23 provided in an outer surfaced of the housing body 19. The decorative cover 20 is fastened to the housing body 19 from the inside of the housing body 19.

Figure 3:
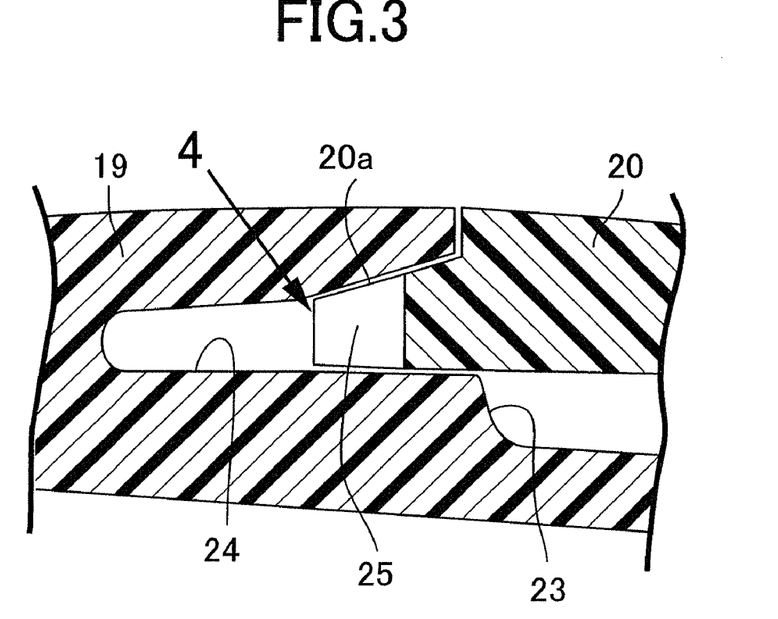
FIG. 3 is an enlarged view of a region indicated by an arrow 3 in FIG. 2.
Figure 4:
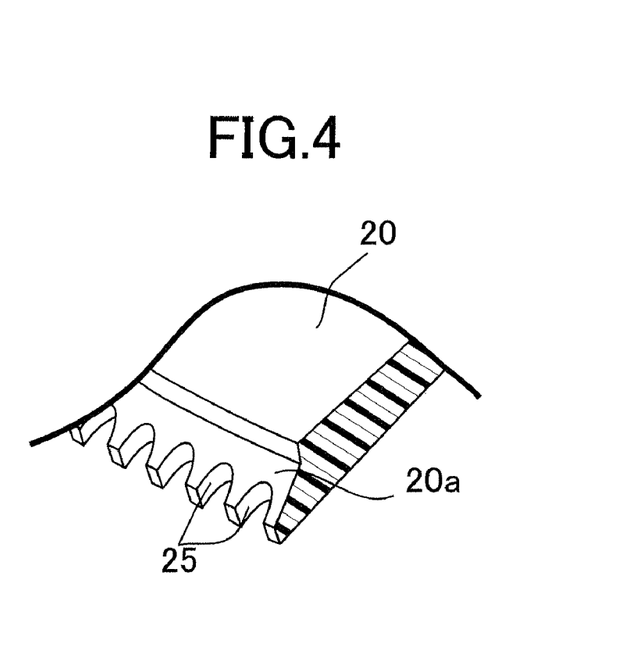
FIG. 4 is a perspective view of a portion of a collar on a decorative cover viewed from a direction of an arrow 4 in FIG. 3.

Referring to FIGS. 3 and 4 in combination, a groove 24 is provided in an upper portion of the peripheral wall of the recess 23 on the housing body 19 side, and a collar 20a is integrally and projectingly provided on an upper portion of the outer peripheral edge of the decorative cover 20 to extend in a direction of assembling of the decorative cover 20 to the housing body 19, so that the collar 20a is superposed on an upper portion of the housing body 19 outer than the groove 24 from the inside at upper opposed sections of the housing body 19 and the decorative cover 20. A plurality of recesses 25 are provided in a juxtaposed manner at a tip end of the collar 20a.

Figure 5:
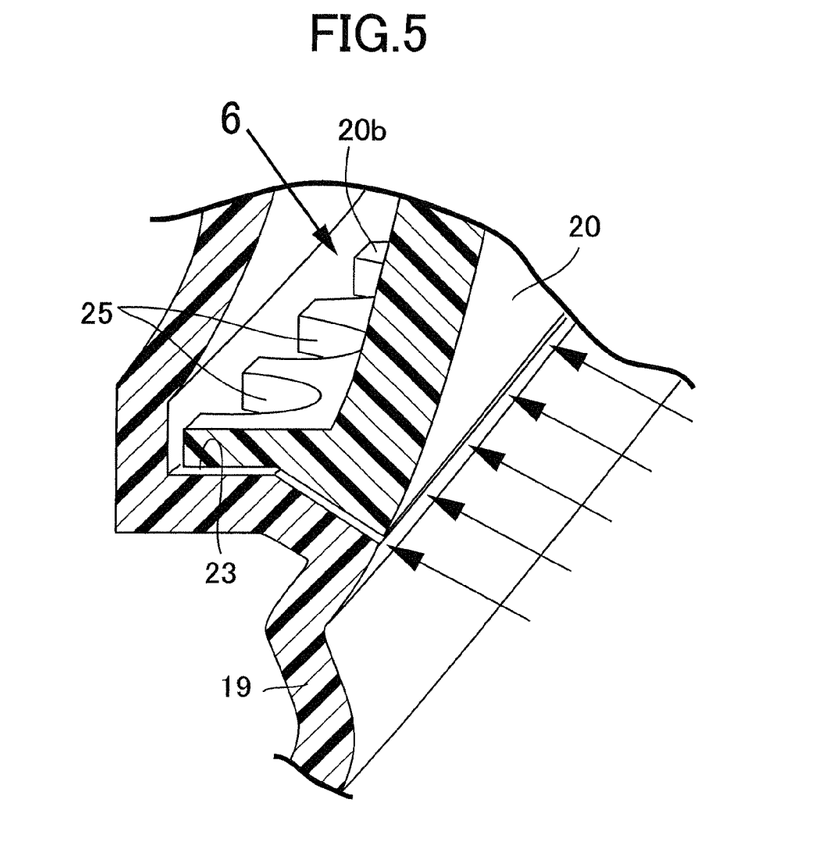
FIG. 5 is an enlarged view of a region indicated by an arrow 5 in FIG. 2.
Figure 6:
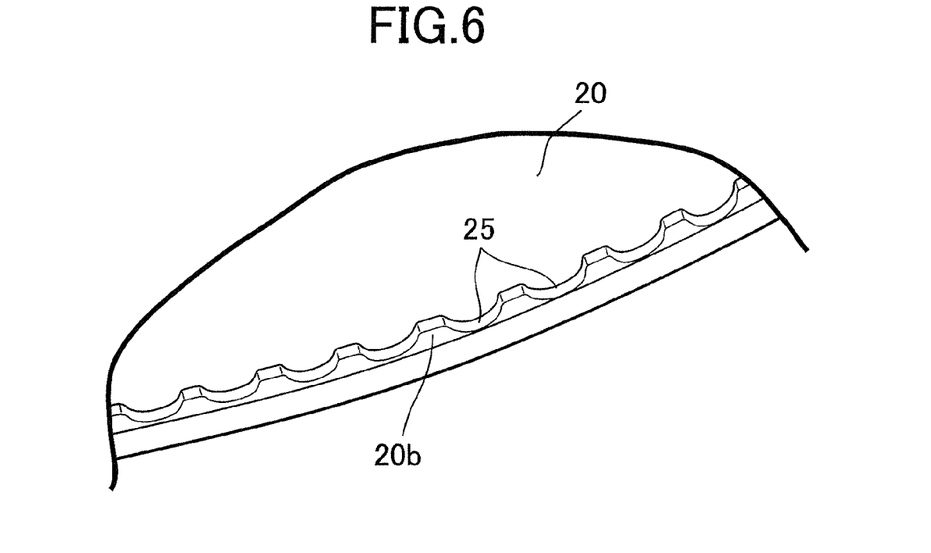
FIG. 6 is a perspective view of a portion of a collar on a decorative cover viewed from a direction of an arrow 6 in FIG. 5.

Referring to FIGS. 5 and 6 in combination, a collar 20b is integrally and projectingly provided on a remaining portion of the outer peripheral edge of the decorative cover 20 excluding the upper portion, so that it is opposed to the peripheral wall of the recess 23 and its opposite ends are formed continuous to opposite ends of the collar 20a. The collar 20b is formed to extend in the direction of assembling of the decorative cover 20 to the housing body 19 in such a manner that it is superposed on the peripheral wall of the recess 23 from the inside, and a plurality of recesses 25 are also provided in a juxtaposed manner in a tip end of the collar 20b.

According to the first embodiment, the collars 20a and 20b are integrally and projectingly provided on one of the housing body 19 and the decorative 20, i.e., on the decorative cover 20 to extend so that the collars 20a and 20b are superposed on the housing body 19 at the opposed sections of the housing body 19 and the decorative cover 20, and the pluralities of recesses 25 are provided in the juxtaposed manner at the tip ends of the collars 20a and 20b. Therefore, even if running wind enters inwards from between the opposed sections of the housing body 19 and the decorative cover 20, the air flow is disturbed by the pluralities of recesses 25 in the collars 20a and 20b provided in the decorative cover 20 and thus, it is possible to suppress the generation of a wind roar to the utmost.

Figure 7:
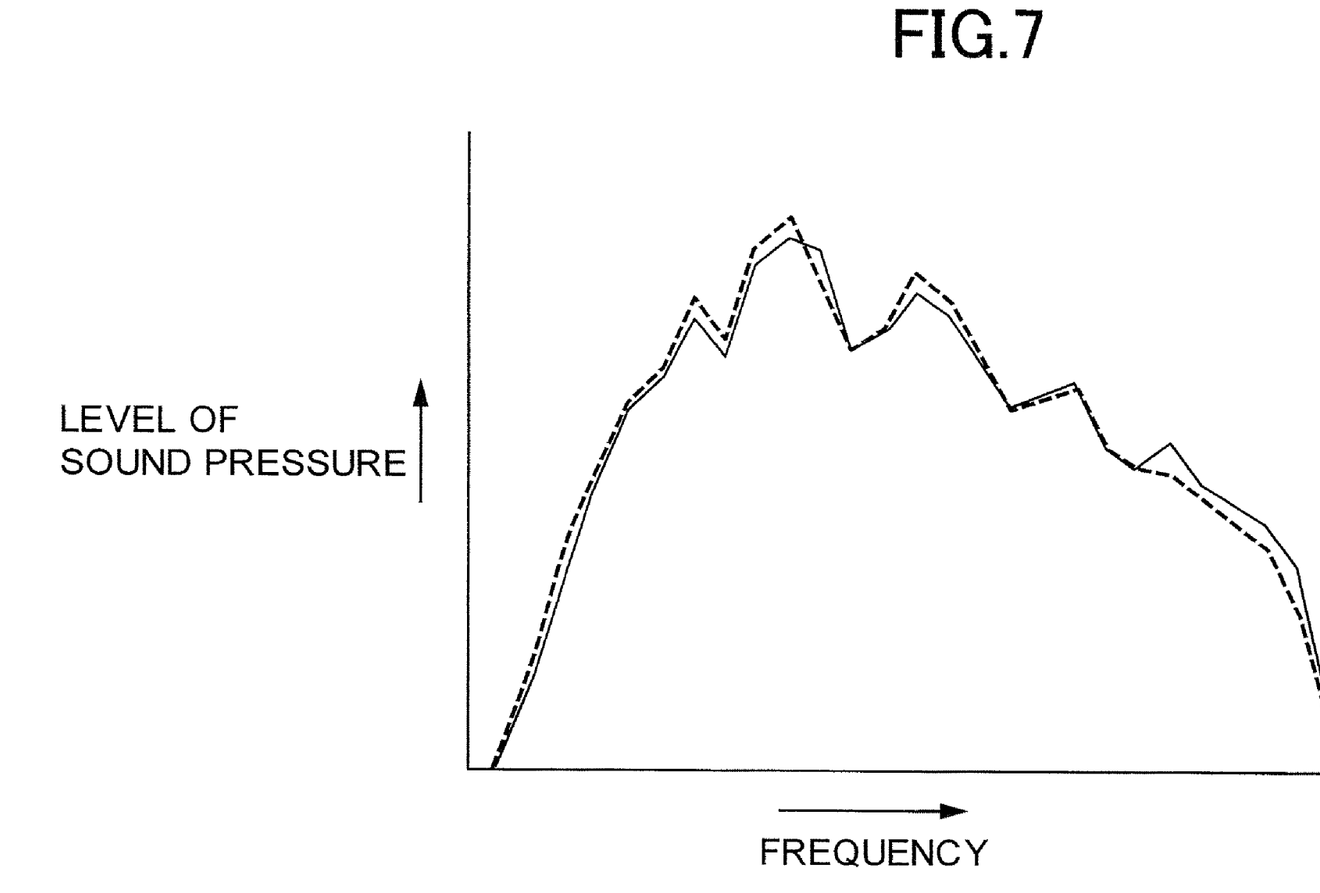
FIG. 7 is a graph showing a wind roar reducing effect in the vehicular mirror device of the present invention in comparison with that in a conventional vehicular mirror device.

A level of a sound pressure of the wind roar generated when the recesses 25 are provided in the juxtaposed manner at the tip ends of the collars 20a and 20b according to the present invention is shown by a broken line in FIG. 7, and on the other hand, a level of a sound pressure of a wind roar generated when no recesses are provided in a juxtaposed manner at the tip ends of the collars is shown by a solid line in FIG. 7. It is obvious that the generation of the wind roar can be suppressed to the utmost by the provision of the recesses 25 in the juxtaposed manner at the tip ends of the collars 20a and 20b according to the present invention.

Moreover, the collars 20a and 20b integrally and projectingly provided on the decorative cover 20 are superposed on the housing body 19 from the inside and hence, the collars 20a and 20b cannot be visually observed from the outside and thus, the appearance cannot be impaired. On the other hand, in a mirror device in which a dimple is formed in one of opposed surfaces of both housing components, the dimple is located at a flow inlet of traveling wind and easily visually observed from the outside, thereby bringing about the degradation of an appearance.

Further, the collars 20a and 20b are integrally provided on the decorative cover 20 to extend in the direction of assembling of the decorative cover 20 to the housing body 19. Therefore, the collars 20a and 20b guide the assembling of the decorative cover 20 to the housing body 19 to facilitate the alignment of the housing body 19 and the decorative cover 20 with each other and thus, it is possible to enhance the assemblability.

FIGS. 8 to 11 show a second embodiment of the present invention.

Figure 8:
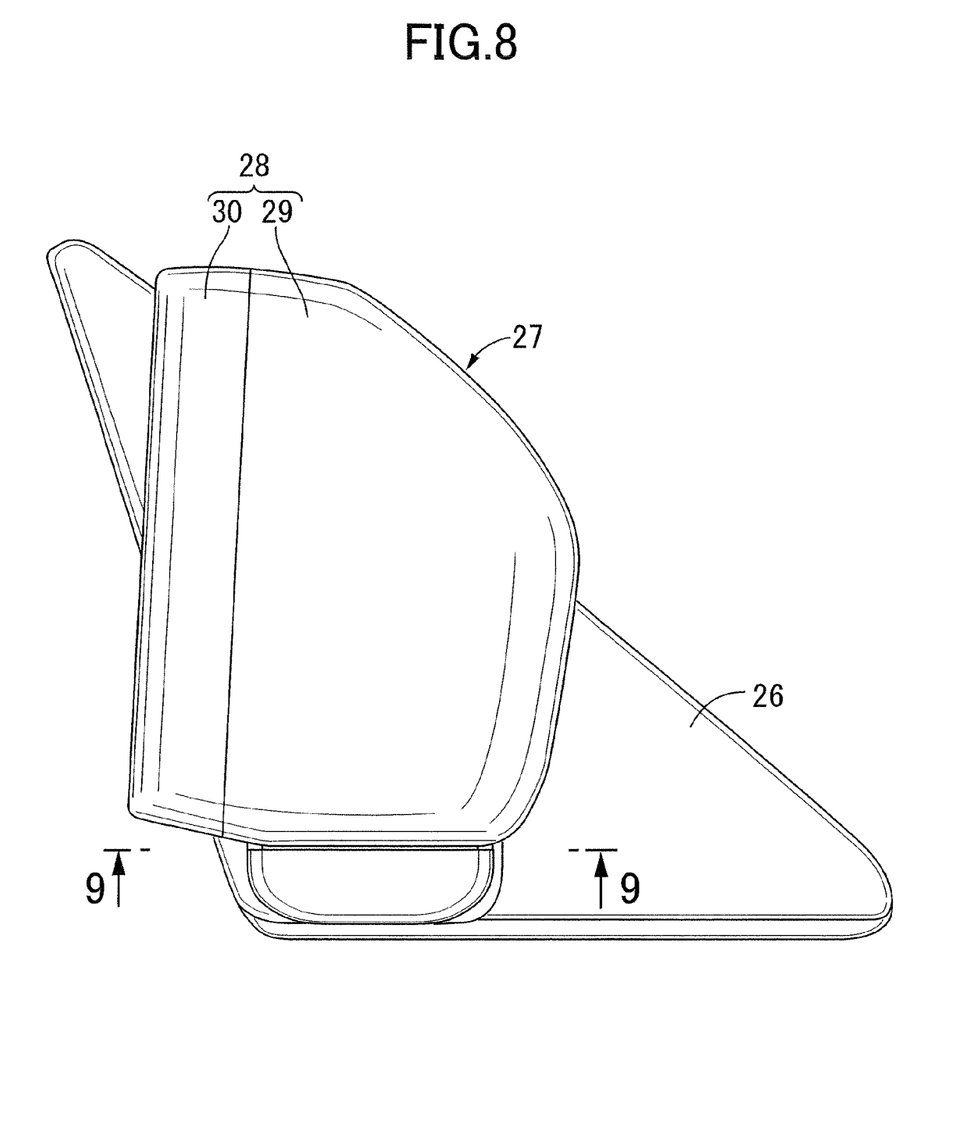
FIG. 8 is a side view of a mirror device according to the second embodiment.

Referring to FIG. 8, a mirror device 27 having a housing 28 is turnably supported on a base 26 mounted on a side door of a vehicle (not shown). The housing 28 is comprised of two housing components: first and second housing halves 29 and 30 coupled to each other. The first housing half 29 is formed into a bowl-shape, and the second housing half 30 is formed into cylindrical shape in such a manner that it is connected to an opened end of the first housing half 29.

Figure 9:
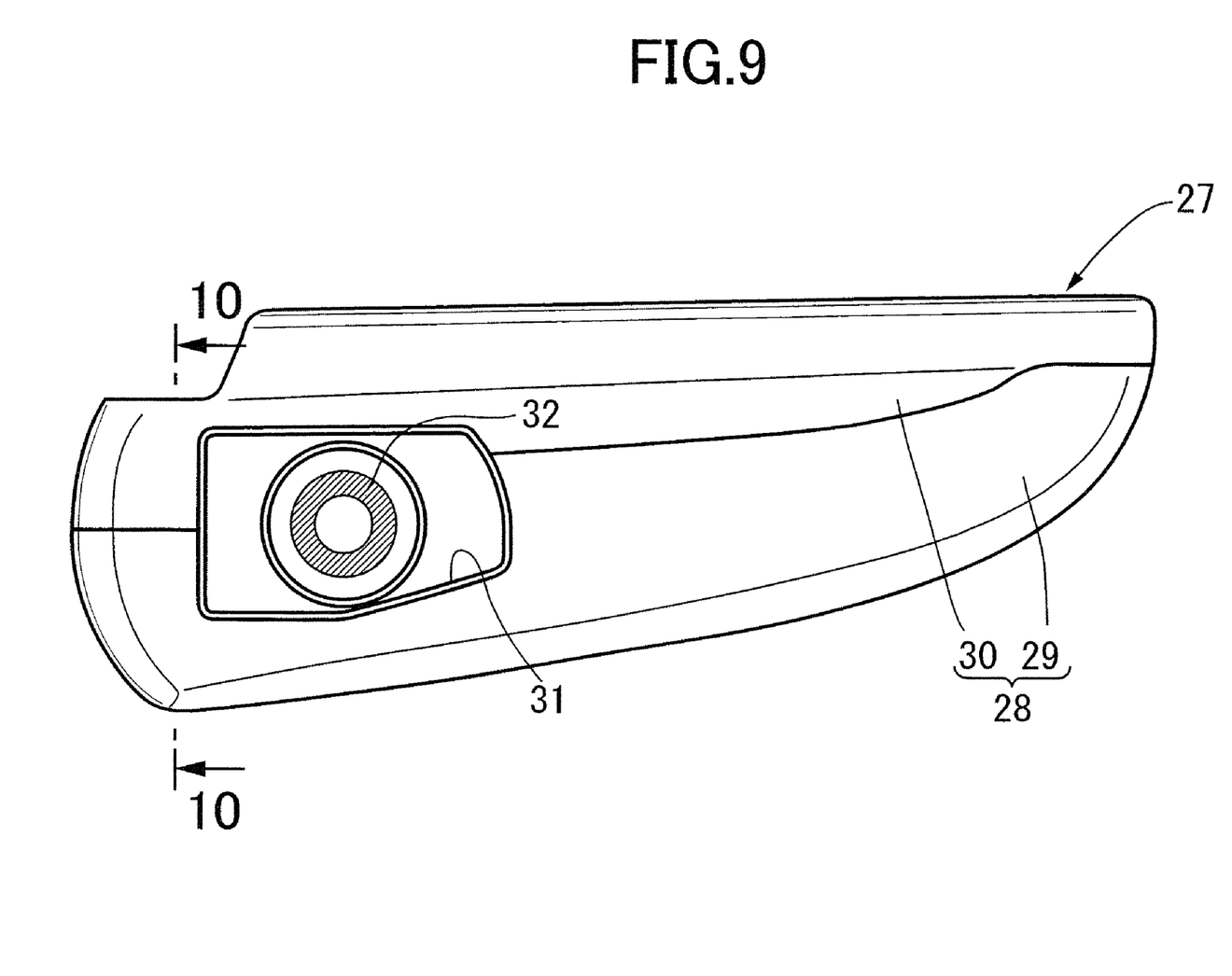
FIG. 9 is a sectional view taken along a line 9-9 in FIG. 8.

Lower portions of the first and second housing halves 29 and 30 form a tetragonal opening 31 as shown in FIG. 9, and a support shaft 32 for turnably supporting the mirror device 27 on the base 26 is disposed in the opening 31.

Figure 10:
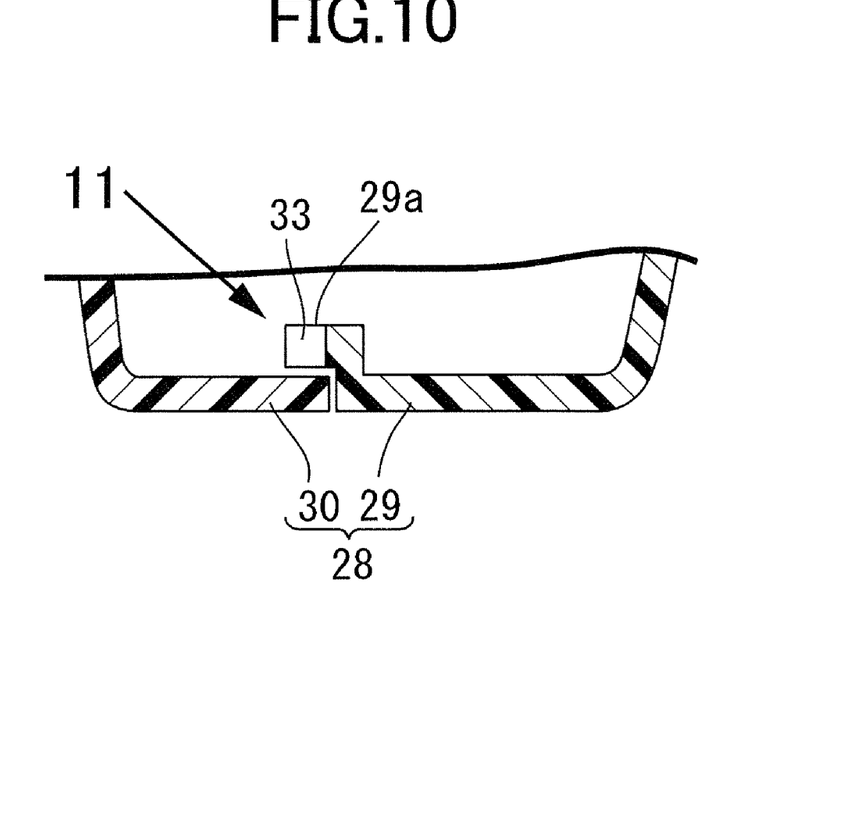
FIG. 10 is a sectional view taken along a line 10-10 in FIG. 9
Figure 11:
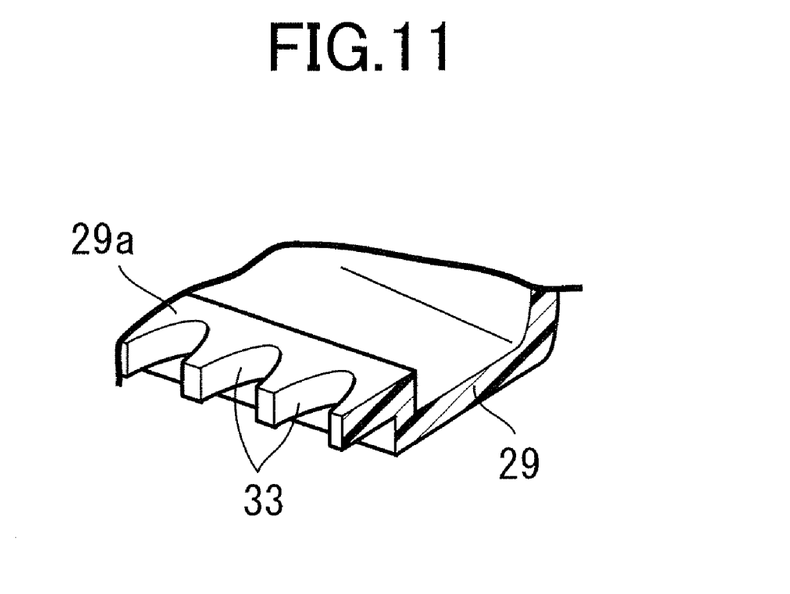
FIG. 11 is a perspective view taken in a direction of an arrow 11 in FIG. 10.

Referring to FIGS. 10 and 11, a collar 29a is integrally and projectingly provided on the entire periphery of the opened end of the first housing half 29 in an opposed relation to one end of the second housing half 30 from the inside, so that its opposite ends are connected to opposite ends of the collar 20a. The collar 20a is formed to extend in a direction of assembling of the first and second housing halves 29 and 30, and a plurality of recesses 33 are provided in a juxtaposed manner in a tip end of the collar 29a.

According to the second embodiment, the collar 29a is integrally and projectingly provided on the first housing half 29, so that it is superposed onto the second housing half 30 at opposed portions of the first and second halves 29 and 30, and the plurality of recesses 33 are provided in the juxtaposed manner in the tip end of the collar 29a. Therefore, even if traveling wind flows inwards from between the opposed portions of the housing halves 29 and 30, an air flow is disturbed by the plurality of recesses 33 in the collar 29a provided on the first housing half 29 and thus, it is possible to suppress the generation of a wind roar to the utmost.

Because the collar 29a integrally and projectingly provided on the first housing half 29 is superposed on the second housing half 30 from the inside, the collar 29a cannot be visually observed from the outside, and the appearance cannot be impaired. Further, because the collar 29a is integrally provided on the first housing half 29 to extend in the direction of assembling the first and second housing halves 29 and 30, the collar 29a acts as a guide during assembling of the first and second housing halves 29 and 30 to facilitate the alignment of the first and second housing halves 29 and 30 with each other, and thus, it is possible to enhance the assemblability.

Figure 12:
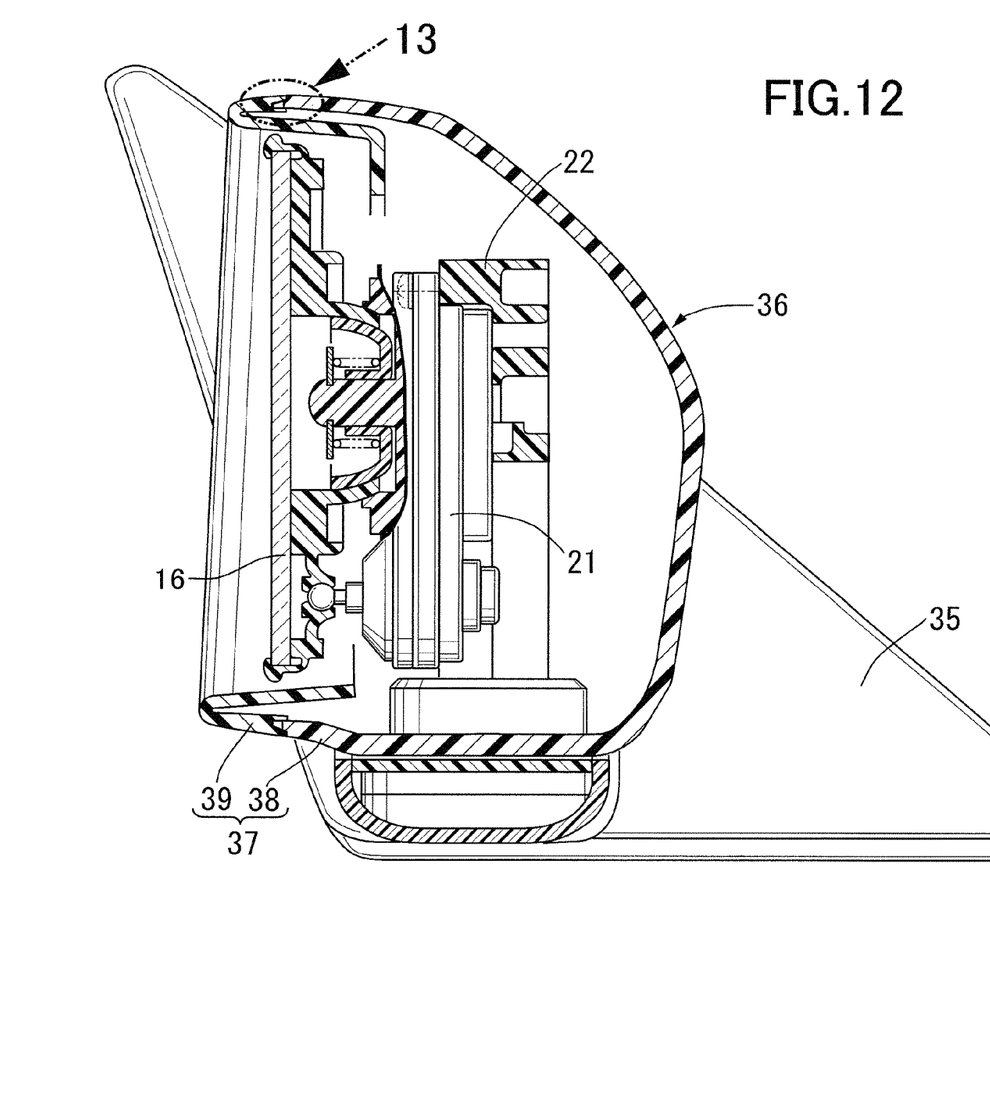
FIG. 12 is a vertical sectional view of mirror device according to the third embodiment.
Figure 13:
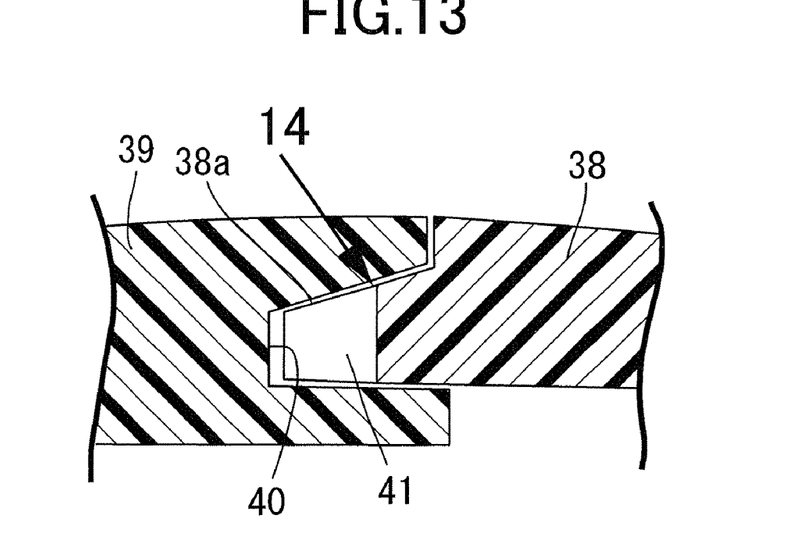
FIG. 13 is an enlarged view of a region indicated by an arrow 13 in FIG. 12.
Figure 14:
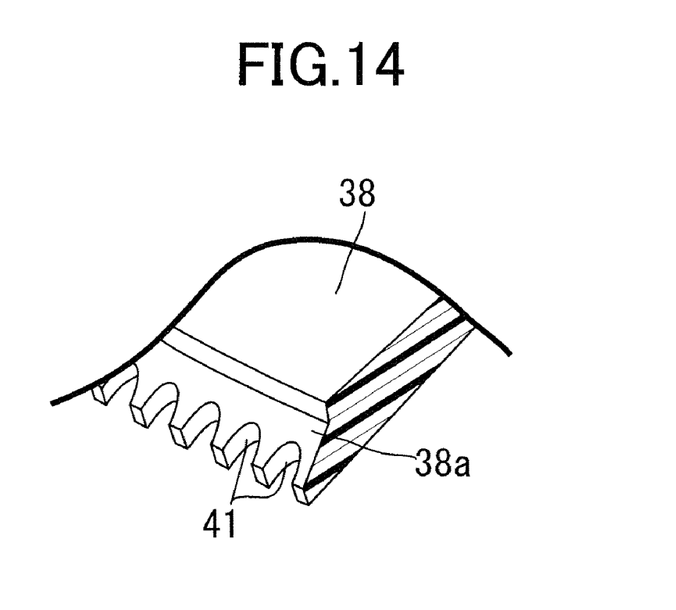
FIG. 14 is a perspective view taken in a direction of an arrow 14 in FIG. 13.

FIGS. 12 to 14 show a third embodiment of the present invention.

It should be noted that the same reference numerals and characters are affixed to portions or components corresponding to those in the first embodiment, and the detailed description of them is omitted.

Referring to FIG. 12, a mirror device 36 is turnably supported on a base 35 mounted on a side door of a vehicle (not shown), and has a housing 37 adapted to cover a mirror 16 from the front during traveling of the vehicle. The housing 37 is comprised of two housing components; a housing body 38 and a visor 39 coupled to each other.

The housing body 38 is formed into a bowl-shape in such a manner that the mirror 16 is disposed in an opening, so that the housing body 38 is opened rearwards during traveling the vehicle. The visor 39 is formed so that a portion thereof is folded back into the opening in the housing body 38 to cover the periphery of the mirror 16. The visor 39 is coupled to an opened edge of the housing body 38.

Referring to FIGS. 13 and 14, a groove 40 is provided over the entire periphery of a surface of the visor 39 opposed to the opened end of the housing body 38. A collar 38a is integrally and projectingly provided in the opened end of the housing body 38 to extend in a direction of assembling of the visor 39 to the housing body 38, so that it is superposed from the inside onto a portion of the visor 39 outer than the groove 40, and a plurality of recesses 41 are provided in a juxtaposed manner in a tip end of the collar 38a.

According to the third embodiment, the collar 38a is integrally and projectingly provided on the housing body 38 to extend so that it is superposed on the visor 39 at opposed portions of the housing body 38 and the visor 39, and the plurality of recesses 41 are provided in the juxtaposed manner in the tip end of the collar 38a. Therefore, even if traveling wind flows inwards from between the opposed surfaces of the housing body 38 and the visor 39, an air flow is disturbed by the plurality of recesses 41 in the collar 38a provided on the housing body 38 and thus, it is possible to suppress the generation of a wind roar to the utmost.

In addition, because the collar 38a integrally and projectingly provided on the housing body 38 is superposed on the visor 39 from the inside, the collar 38a cannot be visually observed from the outside and thus, the appearance cannot be impaired. Further, because the collar 38a is integrally provided on the housing body 38 to extend in the direction of assembling of the housing body 38 and the visor 39, the collar 38a acts as a guide during assembling of the visor 39 to the housing body 38 to facilitate the alignment of the housing body 38 and the visor 39 with each other, and thus, it is possible to enhance the assemblability.

Although the embodiments of the present invention have been described in detail, it will be understood that the present invention is not limited to the above-described embodiments, and various modifications in design may be made without departing from the spirit and scope of the invention defined in claims.

What is claimed is:

1. A vehicular mirror device comprising:
    a housing that includes two housing components at least partially opposed to each other, the housing is adapted to cover a mirror from a front side relative to a traveling direction of a vehicle,
    wherein at least one collar is integrally and projectingly provided on one of said two housing components to extend so that the at least one collar slidably fits within a receiving portion defined within the other housing component at opposed portions of both of said two housing components, and
    wherein a plurality of open ended recesses are defined at a free end of said at least one collar.

2. A vehicular mirror device according to claim 1, wherein said at least one collar is superposed on the other housing component from an inner side.

3. A vehicular mirror device according to claim 2, wherein said at least one collar is integrally provided on said one housing component to extend in a direction of assembling of said two housing components.

4. A vehicular mirror device according to claim 1, wherein said at least one collar is integrally provided on said one housing component to extend in a direction of assembling of said two housing components.

5. A vehicular mirror device according to claim 1, wherein the plurality of open ended recesses are arcuate shaped.

6. A vehicular mirror device according to claim 1, wherein a planar surface separates neighboring recesses.

7. A vehicular mirror device according to claim 1, wherein the plurality of open ended recesses engage a groove defined in an opposing collar provided on the other of said two housing components.

8. A vehicular mirror device according to claim 1, wherein the plurality of open ended recesses are located above a contact point where the at least one collar engages the other of said two housing components.

9. A vehicular mirror device according to claim 1, wherein the receiving portion is a groove.

10. A vehicular mirror device according to claim 1, wherein the receiving portion is a recess.

* * * * *